United States Patent
Song et al.

(10) Patent No.: US 6,867,735 B2
(45) Date of Patent: Mar. 15, 2005

(54) ADAPTIVE ANTENNA ARRAY SYSTEM AND WEIGHTING COEFFICIENT COMPUTATION CONTROL METHOD

(75) Inventors: Shi Song, Kamifukuoka (JP); Tohru Sunaga, Kamifukuoka (JP)

(73) Assignees: KDDI Corporation, Tokyo (JP); Kyocera Corporation, Kyoto (JP)

(*) Notice: Subject to any disclaimer, the term of this patent is extended or adjusted under 35 U.S.C. 154(b) by 0 days.

(21) Appl. No.: 10/810,289

(22) Filed: Mar. 26, 2004

(65) Prior Publication Data

US 2004/0189520 A1 Sep. 30, 2004

(30) Foreign Application Priority Data

Mar. 31, 2003 (JP) ........................................ 2003-095364

(51) Int. Cl.⁷ .......................... H04K 1/00; H04B 1/707
(52) U.S. Cl. ..................................................... 342/377
(58) Field of Search ........................................ 342/377

(56) References Cited

U.S. PATENT DOCUMENTS 6,292,135 B1 * 9/2001 Takatori et al. ............. 342/378
2003/0040281 A1 * 2/2003 Nakao et al. ............... 455/67.1
2004/0088610 A1 * 5/2004 Kobayakawa ............... 714/701

FOREIGN PATENT DOCUMENTS

JP         2002-77012           3/2002

OTHER PUBLICATIONS

Nobuyoshi Kikuma, Ed., "Adaptive Signal Processing by Antenna Arrays", Science Press, Inc., Nov. 1998, pp. 13–66 (Abstract only).

* cited by examiner

Primary Examiner—Thomas H. Tarcza
Assistant Examiner—Fred H Mull
(74) Attorney, Agent, or Firm—Edwards & Angell, LLP; David G. Conlin; George W. Hartnell, III

(57) ABSTRACT

An adaptive antenna array system includes an antenna array having a plurality of antenna elements, the antenna array synthesizing received signals received by each of the antenna elements by weighting them according to a weighting coefficient and outputting a synthesized signal, a weighting coefficient calculation unit for calculating the weighting coefficient of received signals by adaptive control, an evaluation unit for evaluating the convergence status of adaptive control by the weighting coefficient calculation unit, and a control unit for controlling the operation of adaptive control by the weighting coefficient calculation unit corresponding to the results of evaluation of convergence status by the evaluation unit.

10 Claims, 5 Drawing Sheets

ADAPTIVE ANTENNA ARRAY SYSTEM AND WEIGHTING COEFFICIENT COMPUTATION CONTROL METHOD

BACKGROUND OF THE INVENTION

1. Field of the Invention

The present invention relates to an adaptive antenna array system and a method of calculating and controlling weighting coefficient.

Priority is claimed on Japanese Patent Application No. 2003-95364, filed Mar. 31, 2003, the content of which is incorporated herein by reference.

2. Description of Related Art

In conventional adaptive antenna array systems, an antenna array is provided that is composed of a plurality of antenna elements, and the received signal of each antenna element is synthesized and output after weighting the signal using a weighting coefficient for controlling the directivity of the antenna array. In addition, a known example of a method of calculating the weighting coefficient involves the use of an adaptive algorithm based on the minimum mean square error (MMSE) to calculate the weighting coefficient using adaptive control so as to minimize the square error between the received signal of each antenna element and a reference signal (refer to, for example, Nobuyoshi Kikuma, ed., "Adaptive Signal Processing by Antenna arrays", Science Press, Inc., November 1998, p. 13–66). Examples of the aforementioned MMSE-based adaptive algorithm include Least Means Square (LMS) and Recursive Least-Squares (RLS).

In addition, a system has also been studied that reduces the power consumption of the arithmetic processing device (e.g., digital signal processor (DSP)) by reducing the number of calculations for updating the aforementioned weighting coefficient. In this type of system, as is shown, for example, in Japanese Unexamined Patent Application, First Publication No. 2002-77012, by evaluating the propagation path characteristics of a received signal, and controlling the number of updates of the aforementioned weighting coefficient corresponding to the results of this evaluation, the number of calculations for updating the weighting coefficient is known to be reduced. An example of a parameter used to represent propagation path characteristics is the phasing speed of a mobile terminal device. If the phasing speed is slower than a predetermined value, there is judged to be little fluctuation in the weighting coefficient itself, and the weighting coefficient calculated with the previous frame is continued to be used, thereby reducing the number of updates of the weighting coefficient. For example, the number of updates is taken at a ratio of one frame for each of a predetermined number of frames.

In addition, updating processing of the weighting coefficient may be made to not be performed until the error of the weighting coefficient increases to the extent that a cyclic redundancy check (CRC) error or other reception error occurs in the received signal.

However, the aforementioned prior art has the problems indicated below.

In the case of a system that reduces the number of updates of the weighting coefficient based on the phasing speed of a mobile terminal device, since the judgment as to whether or not the number of updates of the weighting coefficient can be reduced is dependent upon empirically obtained conditions, the number of updates is not always reduced corresponding to the fluctuation in the weighting coefficient, thereby resulting in the risk of deterioration of reception quality.

In addition, in the case of a system that updates the weighting coefficient after a reception error is generated, there is the risk of having a serious detrimental effect on reception quality, thereby making this undesirable.

In order to accurately make the weighting coefficient follow fluctuations in the propagation path characteristics of a received signal, it is not desirable to reduce the number of updates of the weighting coefficient. On the other hand, a large number of calculations increases the current consumption of the mobile terminal, thereby having the detrimental effects of increased battery size and shortened battery life.

On the basis of such reasons, there is a need to obtain a suitable weighting coefficient while also reducing the number of calculations required.

In consideration of such circumstances, the object of the present invention is to provide an adaptive antenna array system and weighting coefficient calculation and control method capable of reducing current consumption by reducing the number of calculations required to obtain a suitable weighting coefficient.

SUMMARY OF THE INVENTION

The first aspect of the present invention is an adaptive antenna array system having an antenna array comprising a plurality of antenna elements, the antenna array synthesizing received signals received by each of the antenna elements by weighting them according to a weighting coefficient and outputting a synthesized signal, a weighting coefficient calculation unit for calculating the weighting coefficient of received signals by adaptive control, an evaluation unit for evaluating the convergence status of adaptive control by the weighting coefficient calculation unit, and a control unit for controlling the operation of adaptive control by the weighting coefficient calculation unit corresponding to the results of evaluation of convergence status by the evaluation unit.

In the above adaptive antenna array system, the weighting coefficient calculation unit may calculate the weighting coefficient by adaptive control using an adaptive algorithm based on the minimum mean square error method so as to minimize the moving average square error between a reference signal and an output signal, and the evaluation unit may judge that adaptive control by the weighting coefficient calculation unit has converged in the case the moving average square error is continuously below a predetermined value for a predetermined number of times.

In the above adaptive antenna array system, the weighting coefficient calculation unit may calculate the weighting coefficient by adaptive control using an adaptive algorithm based on the minimum mean square error method so as to minimize the moving average square error between a reference signal and an output signal, and the evaluation unit may judge that adaptive control by the weighting coefficient calculation unit has converged in the case the rate of change of the moving average square error has fallen below a predetermined value.

In the above adaptive antenna array system, the control unit may stop the operation of adaptive control by the weighting coefficient calculation unit, when the control unit judges by the evaluation unit that adaptive control by the weighting coefficient calculation unit has converged.

In the above adaptive antenna array system, the control unit may intermittently activate adaptive control by the weighting coefficient calculation unit, when the control unit judges by the evaluation unit that adaptive control by the weighting coefficient calculation unit has converged.

In the above adaptive antenna array system, the control unit may intermittently activate adaptive control by the weighting coefficient calculation unit at a specific interval.

In the above adaptive antenna array system, the control unit may return adaptive control by the weighting coefficient calculation unit to the steady state when conditions for judging convergence of adaptive control by the evaluation unit are no longer satisfied in the case adaptive control by the weighting coefficient calculation unit is being activated intermittently.

In the above adaptive antenna array system, the control unit may adaptively control the interval at which adaptive control by the weighting coefficient calculation unit is activated intermittently.

The second aspect of the present invention is a weighting coefficient calculation and control method in an adaptive antenna array system which includes an antenna array composed of a plurality of antenna elements, and synthesizes received signals received with the antenna elements by weighting the signals according to a weighting coefficient and outputs a synthesized signal, the method having a weighting coefficient calculation step for calculating the weighting coefficient of the received signals by adaptive control, an evaluation step for evaluating the convergence status of adaptive control by the weighting coefficient calculation step, and a control step for controlling operation of adaptive control by the weighting coefficient calculation step corresponding to the results of the evaluation of convergence status by the evaluation step.

DETAILED DESCRIPTION OF THE INVENTION

The following provides an explanation of an embodiment of the present invention with reference to the drawings. Furthermore, in the present embodiment, the example of Code Division Multiple Access (CDMA) system referred to as "cdma2000 1xEV-DO" is used to explain the wireless communication system.

Figure 1:
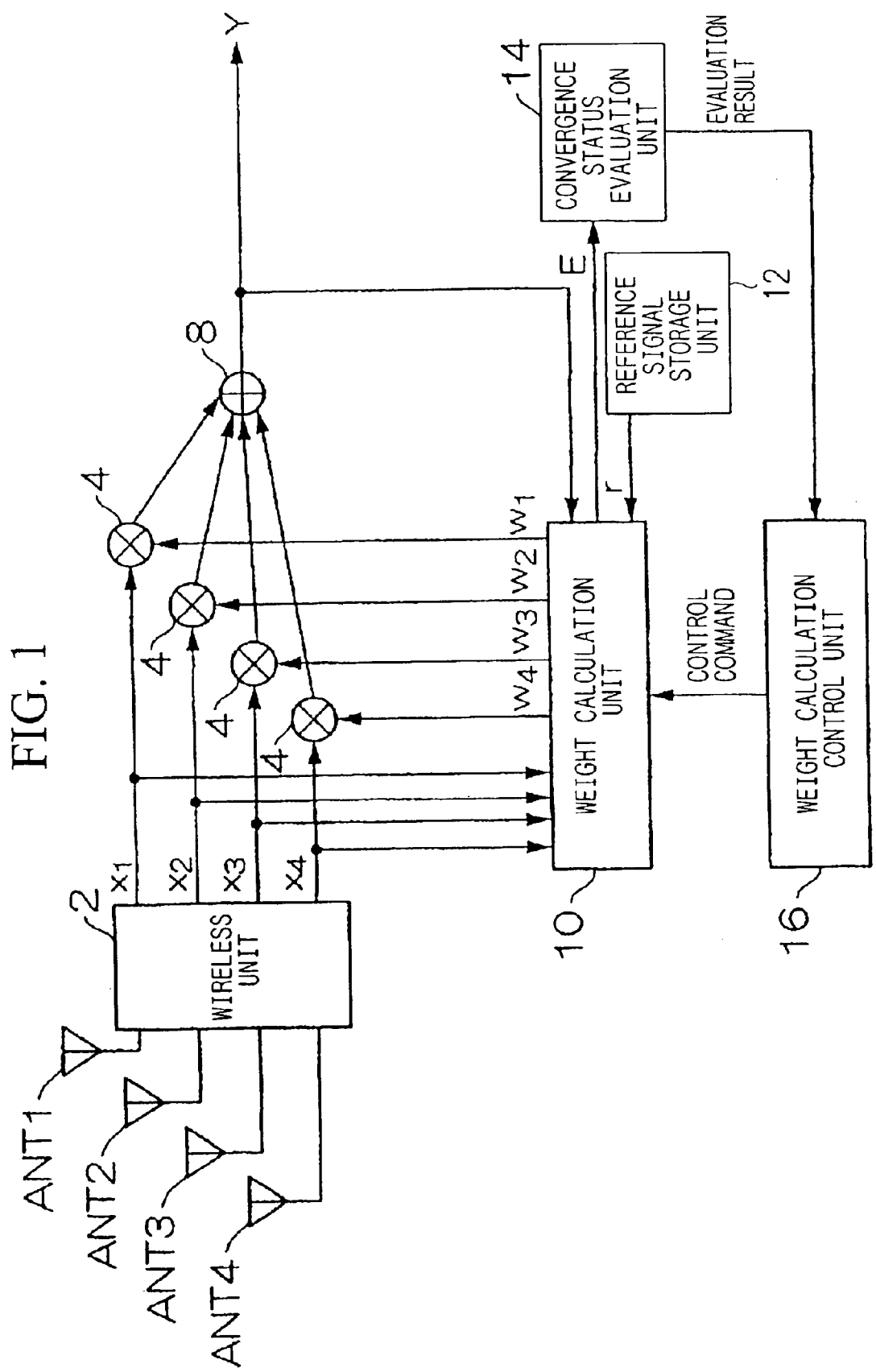
FIG. 1 is a block diagram showing the configuration of an adaptive antenna array system according to an embodiment of the present invention.

FIG. 1 is a block diagram showing the configuration of an adaptive antenna array system according to an embodiment of the present invention. The adaptive antenna array system shown in FIG. 1 has, for example, a mobile station (e.g., cellular phone) provided in the "cdma2000 1xEV-DO" type of wireless communication system, and receives radio signals transmitted from a wireless base station using a plurality of antenna arrays consisting of ANT1 through ANT4 (four are shown in FIG. 1), followed by synthesizing received signals by weighting with a weighting coefficient.

Figure 2:
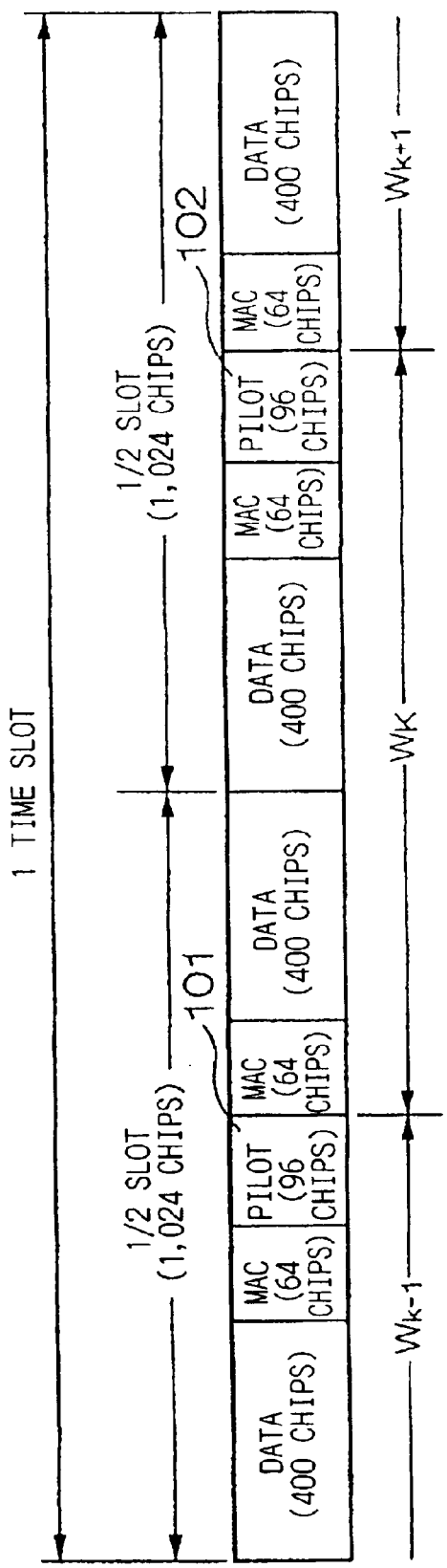
FIG. 2 is a drawing showing a portion of the configuration of a frame used when radio signals are received by the system of FIG. 1.

FIG. 2 shows a portion of the configuration of a frame used when transferring radio signals from a wireless base station to a mobile station in the "cdma2000 1xEV-DO" wireless communication system. The frame shown in FIG. 2 is used when radio signals are received by the system shown in FIG. 1. FIG. 2 shows the configuration of a time slot, a plurality of which are multiplexed based on time division within the frame. In this FIG. 2, the pilot signal is a known signal, and is composed of 96 elements (96 chips) of a diffusion signal (PN code) in the CDMA system. The pilot signal is used to calculate the weighting coefficient by adaptive control. For example, pilot signal 101 is used to calculate the weighting coefficient Wk for received signals over the interval from the following MAC signal to the next pilot signal 102.

In FIG. 1, the adaptive antenna array system is provided with an antenna array composed of four antenna elements ANT1 through ANT4, a wireless unit 2, multipliers 4, an adder 8, a weight calculation unit 10, a reference signal storage unit 12, a convergence status evaluation unit 14 and a weight calculation control unit 16.

Wireless unit 2 amplifies the radio signals from antenna elements ANT1 through ANT4, and after converting them to base band signals, outputs received signals $X_1$ through $X_4$ following conversion to digital signals by an analog to digital converter (A/D converter). These signals $X_1$ through $X_4$ correspond to antenna elements ANT1 through ANT4, respectively.

Multipliers 4 are provided corresponding to each antenna element ANT1 through ANT4. The received signal corresponding to each antenna element is input to each multiplier 4 from wireless unit 2. In addition, a weighting coefficient corresponding to each antenna element is input to each multiplier 4 from weight calculation unit 10.

Multipliers 4 carry out weighting by multiplying the input received signals by a weighting coefficient from weight calculation unit 10. The weighted received signals are then input to adder 8. Adder 8 synthesizes a signal by adding the weighted received signals input from each multiplier 4 to generate and output an output signal Y. In addition, this output signal Y is input to weight calculation unit 10.

Weight calculation unit 10 (weighting coefficient calculation unit) calculates a weighting coefficients $W_1$ through $W_4$ for controlling the directivity of the antenna array composed of antenna elements ANT1 through ANT4 using an MMSE-based adaptive algorithm. The least mean square (LMS) method or recursive least-squares (RLS) method can be used for this adaptive algorithm.

A reference signal r from reference signal storage unit 12, received signals $X_1$ through $X_4$ and output signal Y from wireless unit 2, and a control command from weight calculation control unit 16 are input to weight calculation unit 10. Reference signal storage unit 12 has reference signal r corresponding to a known pilot signal shown in the aforementioned FIG. 2 pre-stored in memory.

Weight calculation unit 10 calculates weighting coefficients $W_1$ through $W_4$ by adaptive control using input reference signal r, received signals $X_1$ through $X_4$ and output signal Y so as to minimize the moving average square error E between reference signal r and output signal Y. Computational processing of these weighting coefficients is carried out on a pilot signal composed of 96 chips. Namely, each time a pilot signal is received, the calculated weighting coefficients $W_1$ through $W_4$ are respectively input to the corresponding multipliers to update the weighting coefficients.

Weight calculation unit 10 performs arithmetic processing of adaptive control in chip units in order starting with the first chip in the pilot signal during a single round of weighting coefficient updating processing. In the case a control command has been received from weight calculation control unit 16, arithmetic processing of adaptive control is performed in accordance with that control command.

In addition, weight calculation unit 10 outputs the aforementioned moving average square error E to convergence status evaluation unit 14 for each arithmetic processing of adaptive control of the pilot signal in chip units. Moving average square error E is defined by equations 1 and 2.

$$e(t)=|r(t)-W_k^H(t)X(t)|^2 \qquad \text{(Equation 1)}$$

$$E(m) = \frac{1}{L}\sum_{n=m-L+1}^{m} e(t_n) \qquad \text{(Equation 2)}$$

In these equations, t represents the time in chip units from the first chip to the 96th chip, r(t) represents the reference signal at time t, $W_k(t)$ represents weighting coefficient vectors $[W(t)_1-W(t)_4]$ at time t, X(t) represents the received signal vectors $[X(t)_1-X(t)_4]$ at time t, e(t) represents the momentary square error at time t, E(m) represents the moving average square error over moving average interval m, L represents the moving average length, $t_n$ represents the time corresponding to the nth chip (n=1, 2, 3, . . . 96), and H is the notation for the complex conjugate transposition.

Convergence status evaluation unit 14 (evaluation unit) evaluates the status of convergence of adaptive control by weight calculation unit 10 based on moving average square error E from said weight calculation unit 10. A detailed description of this evaluation method is provided later. Convergence status evaluation unit 14 outputs the results of evaluation to weight calculation control unit 16.

Weight calculation control unit 16 (control unit) controls the operation of adaptive control by weight calculation unit 10 corresponding to the evaluation results from convergence status evaluation unit 14. The method for controlling operation of adaptive control is described in detail later.

Next, an explanation is provided of the aforementioned method used to evaluate the convergence status of adaptive control.

In the present embodiment, the convergence status of adaptive control by weight calculation unit 10 is evaluated based on the moving average square error E. Although various methods may be considered for performing this evaluation, the following provides an explanation of the method using the following example.

Figure 3:
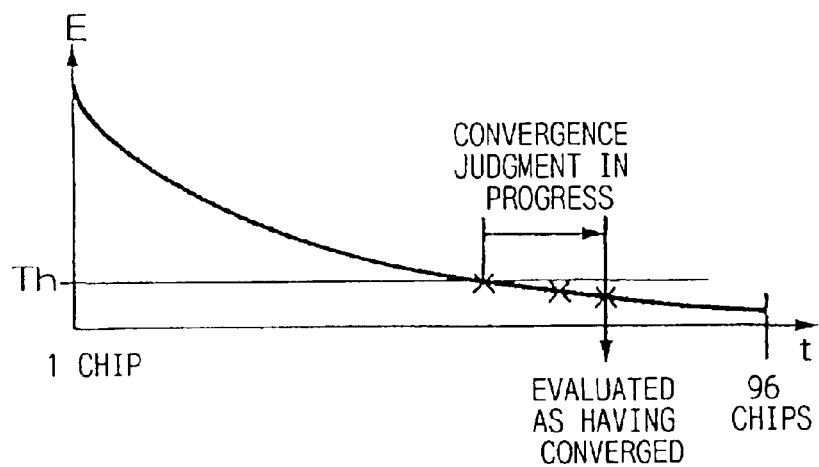
FIG. 3 is a drawing for explaining the method for evaluating convergence status of adaptive control in the present embodiment.

First, an explanation is provided of a first evaluation method. FIG. 3 is a drawing for explaining the first evaluation method. In this first evaluation method, as shown in FIG. 3, if moving average square error E is continuously below a predetermined threshold value Th for a predetermined number of times, adaptive control by weight calculation unit 10 is judged to have converged. Alternatively, adaptive control may also be judged to have converged if moving average square error E is below predetermined threshold value Th even once. A value, for example, corresponding to the lower limit value of CIR based on the dynamic range of CIR should be selected for the value of the aforementioned threshold value Th.

Next, an explanation is provided of a second evaluation method. In this second evaluation method, a judgment of whether or not adaptive control by weight calculation unit 10 has converged is made on the basis of the rate of change of moving average square error E. The rate of change β of moving average square error E is defined by equation 3.

$$\beta(m) = \frac{|E(m) - E(m-1)|}{E(m)} \qquad \text{(Equation 3)}$$

Adaptive control is judged to have converged if the rate of change β is smaller than a predetermined threshold value β0.

When convergence status evaluation unit 14 has judged that adaptive control by weight calculation unit 10 has converged, it notifies weight calculation control unit 16 to that effect.

In the present embodiment as described above, adaptive control by weight calculation unit 10 is judged to have converged based on moving average square error E. Moving average square error is known to correlate with the degree of improvement of carrier to interference ratio (CIR). CIR serves as a representation of reception characteristics. Thus, a weighting coefficient when adaptive control has been judged to have converged is able to maintain satisfactory reception quality by using a threshold value Th or β0 corresponding to a satisfactory CIR.

Next, an explanation is provided of the aforementioned method for controlling the operation of adaptive control. In the present embodiment, during each round of updating processing of the weighting coefficient for a single pilot by weight calculation unit 10, the operation of adaptive control by weight calculation unit 10 is controlled so as to reduce the number of calculations during subsequent weighting coefficient updating processing after adaptive control by weight calculation unit 10 has been judged to have converged by the aforementioned evaluation method. Although various methods can be considered for this method for controlling the operation of adaptive control, the following provides an explanation of examples of that method.

First, an explanation is provided of a first operation control method. In this first operation control method, operation of adaptive control is stopped once adaptive control by weight calculation unit 10 has been judged to have converged. As a result, weight calculation unit 10 no longer computes adaptive control for a chip once it has received a command to stop operation. Weight calculation unit 10 then uses the weighting coefficient at the time the operation was stopped to update the weighting coefficient. As a result, the number of calculations for updating the weighting coefficient in weight calculation unit 10 is reduced.

Figure 4:
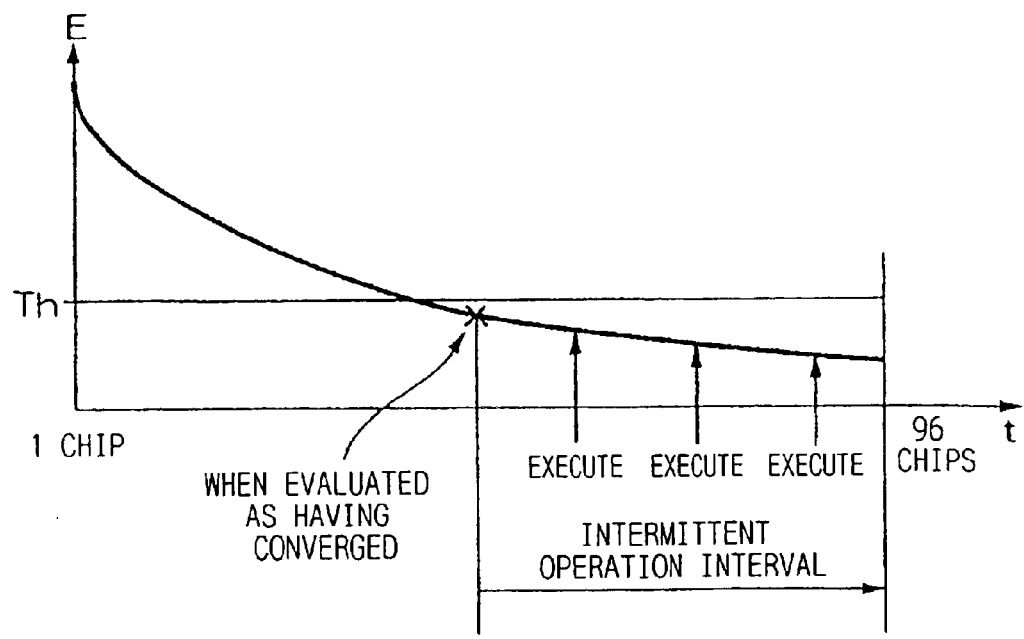
FIG. 4 is a drawing for explaining one method for controlling the operation of adaptive control in the present embodiment.

Next, an explanation is provided of a second operation control method. FIG. 4 is a drawing for explaining a second operation control method. In this second operation control method, as shown in FIG. 4, adaptive control is operated intermittently instead of for each chip once adaptive control by weight calculation unit 10 has been judged to have converged. As a result, weight calculation unit 10 computes adaptive control for one chip only once it has received a command to start the operation. Weight calculation unit 10 then uses the weighting coefficient obtained in the last computation of adaptive control to update the weighting coefficient. As a result, together with the number of calculations for updating the weighting coefficient in weight calculation unit 10 being reduced, adaptive control is performed at a time that is as close as possible to the received signal to which the weighting coefficient is applied, thereby improving the accuracy of the weighting coefficient.

Furthermore, the aforementioned intermittent operation method may be activated at a specific interval.

In addition, in the case adaptive control by weight calculation unit 10 is operated intermittently, the adaptive control may be returned to the steady state once the conditions for judging convergence based on the aforementioned threshold value Th or threshold value $\beta0$ are no longer satisfied.

In addition, the operating interval may also be controlled adaptively. In one example of such a method for adaptive control of the operating interval, the moving average square error E is monitored by convergence status evaluation unit 14 once it has been judged to have converged. The operating interval may then be made to increase during the time the moving average square error E is decreasing, and may be made to decrease during the time the moving average square error E is increasing. For example, a chip (time) targeted for adaptive control is controlled according to equation 4.

$$t_{n+1} = t_n + \Delta t_{n+1} \quad \text{(Equation 4)}$$

In this equation, $\Delta t_{n+1}$ is $\Delta t_{n+1}+1$ when $\beta(n)<\beta0$, and 1 when $\beta(n) \geq \beta0$.

Figure 5:
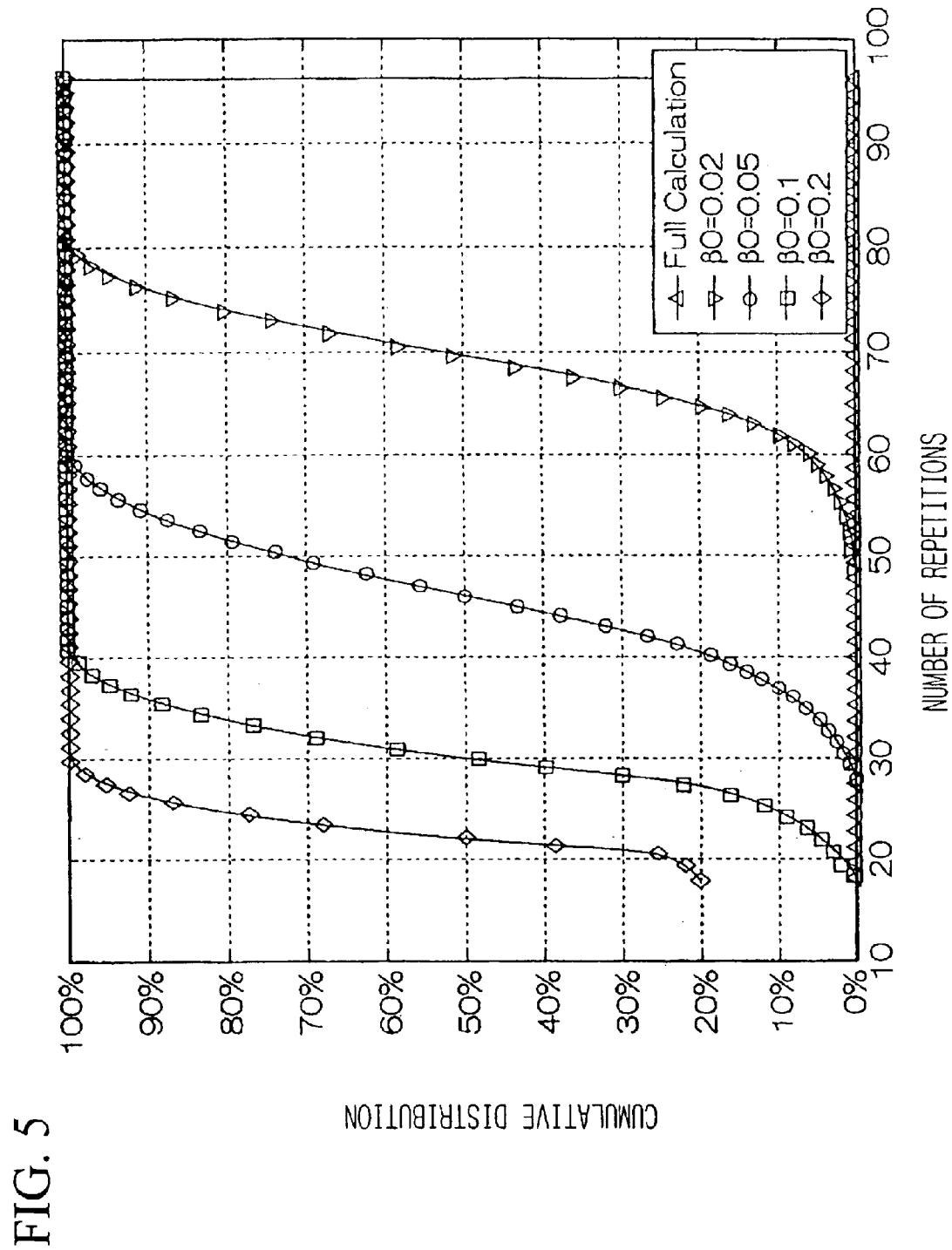
FIG. 5 is a first drawing showing simulation results obtained by one method for controlling the operation of adaptive control in the present embodiment.
Figure 6:
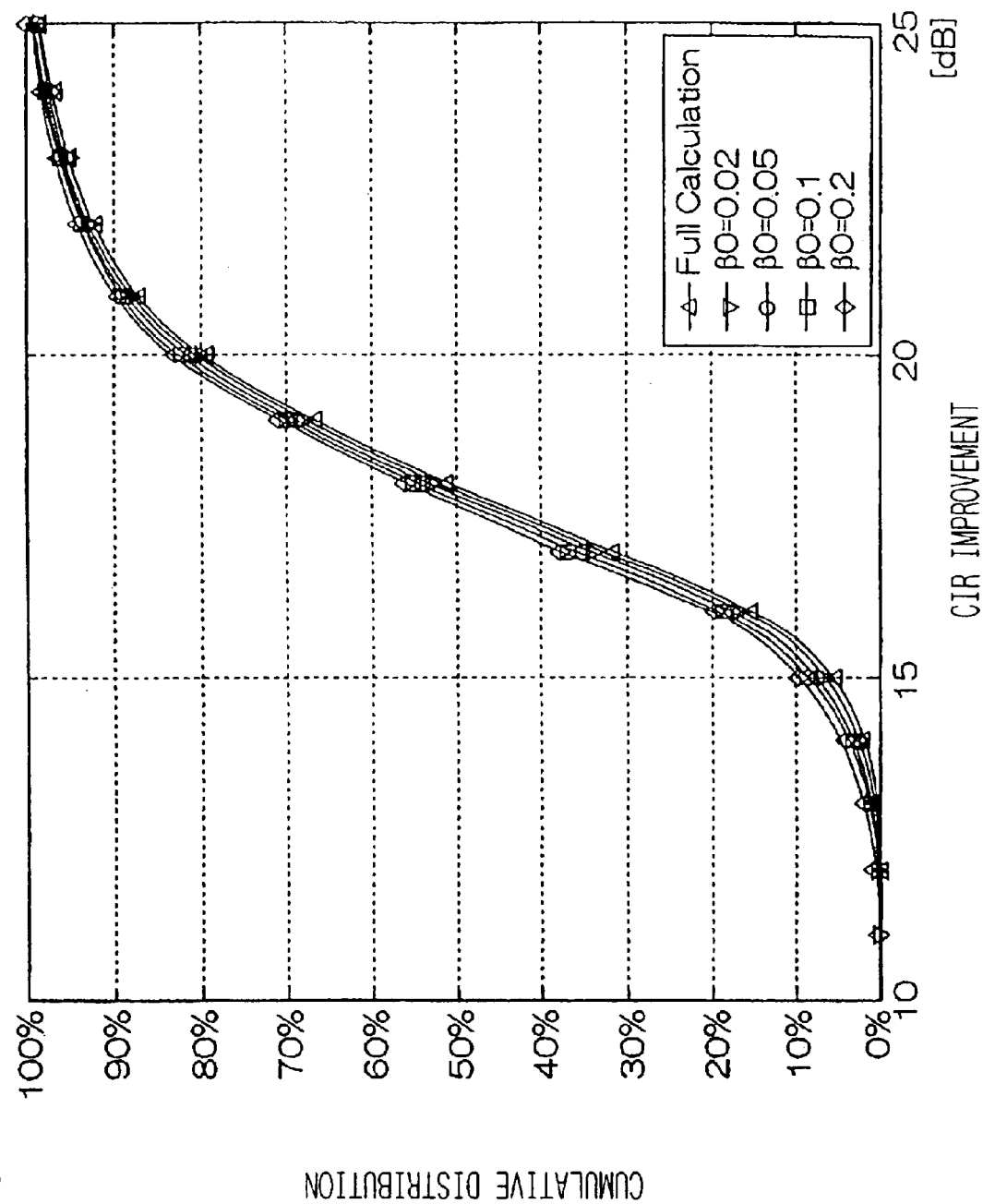
FIG. 6 is a second drawing showing simulation results obtained by one method for controlling the operation of adaptive control in the present embodiment.

FIGS. 5 and 6 show the results of simulations in the case of adaptively controlling the operation interval for adaptive control according to the aforementioned equation 4. FIG. 5 shows the cumulative distribution of the number of computations for adaptive control, while FIG. 6 shows the cumulative distribution of the degree of improvement in CIR.

As shown in FIG. 5, the number of computations for adaptive control decrease corresponding to the value of threshold $\beta0$. In contrast, as shown in FIG. 6, the degree of improvement in CIR is roughly the same even through the value of threshold $\beta0$ changes. In this manner, according to the present embodiment, in addition to being able to maintain reception quality, the number of calculations required until a suitable weighting coefficient is obtained can be reduced. As a result, the amount of power consumed by the DSP and other components is reduced.

Furthermore, the adaptive antenna array system of the present invention can be similarly applied to a wireless base station. In addition, it can also be applied to various wireless communication systems such as the aforementioned "cdma2000 1xEV-DO" system provided the system computes the weighting coefficients of received signals by adaptive control.

Although the aforementioned explanations have provided a detailed description of an embodiment of the present invention with reference to the drawings, the concrete configuration is not limited to this embodiment, but rather design changes and so forth are also included within a scope that does deviate from the gist of the present invention.

As has been explained above, according to the present invention, since the convergence status of adaptive control is evaluated during calculation of a weighting coefficient, and the operation of said adaptive control is controlled corresponding to the result of that evaluation, the number of calculations required to obtain a suitable weighting coefficient can be reduced. As a result, since the power consumed by DSP and other components is reduced, a reduction in power consumption can be achieved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An adaptive antenna array system comprising:

an antenna array comprising a plurality of antenna elements, the antenna array synthesizing received signals received by each of the antenna elements by weighting them according to a weighting coefficient and outputting a synthesized signal;

a weighting coefficient calculation unit for calculating the weighting coefficient of received signals by adaptive control;

an evaluation unit for evaluating the convergence status of adaptive control by the weighting coefficient calculation unit; and a control unit for controlling the operation of adaptive control by the weighting coefficient calculation unit corresponding to the results of evaluation of convergence status by the evaluation unit.

2. An adaptive antenna array system according to claim 1, wherein the weighting coefficient calculation unit calculates the weighting coefficient by adaptive control using an adaptive algorithm based on the minimum mean square error method so as to minimize the moving average square error between a reference signal and an output signal, and the evaluation unit judges that adaptive control by the weighting coefficient calculation unit has converged when the moving average square error is continuously below a predetermined value for a predetermined number of times.

3. An adaptive antenna array system according to claim 1, wherein the weighting coefficient calculation unit calculates the weighting coefficient by adaptive control using an adaptive algorithm based on the minimum mean square error method so as to minimize the moving average square error between a reference signal and an output signal, and the evaluation unit judges that adaptive control by the weighting coefficient calculation unit has converged when the rate of change of the moving average square error has fallen below a predetermined value.

4. An adaptive antenna array system according to claim 1, wherein the control unit stops the operation of adaptive control by the weighting coefficient calculation unit, when the control unit judges by the evaluation unit that adaptive control by the weighting coefficient calculation unit has converged.

5. An adaptive antenna array system according to claim 1, wherein the control unit intermittently activates adaptive control by the weighting coefficient calculation unit, when the control unit judges by the evaluation unit that adaptive control by the weighting coefficient calculation unit has converged.

6. An adaptive antenna array system according to claim 5, wherein the control unit intermittently activates adaptive control by the weighting coefficient calculation unit at a specific interval.

7. An adaptive antenna array system according to claim 5, wherein the control unit returns adaptive control by the weighting coefficient calculation unit to a constant state when conditions for judging convergence of adaptive control by the evaluation unit are no longer satisfied in the case adaptive control by the weighting coefficient calculation unit is being activated intermittently.

8. An adaptive antenna array system according to claim 5, wherein the control unit adaptively controls an interval at which adaptive control by the weighting coefficient calculation unit is activated intermittently.

9. A weighting coefficient calculation and control method in an adaptive antenna array system which comprises an antenna array composed of a plurality of antenna elements, and synthesizes received signals received with the antenna elements by weighting the signals according to a weighting coefficient and outputs a synthesized signal, the method comprising:

a weighting coefficient calculation step for calculating the weighting coefficient of the received signals by adaptive control;

an evaluation step for evaluating the convergence status of adaptive control by the weighting coefficient calculation step; and a control step for controlling operation of adaptive control by the weighting coefficient calculation step corresponding to the results of the evaluation of convergence status by the evaluation step.

10. A mobile station comprising:

a receiving unit for receiving a radio signal transmitted from a wireless base station using a plurality of antennas;

a weighting coefficient calculation unit for calculating the weighting coefficient of received signals by adaptive control;

an evaluation unit for evaluating the convergence status of the adaptive control by the weighting coefficient calculation unit; and a control unit for controlling the operation of the adaptive control by the weighting coefficient calculation unit corresponding to the results of th evaluation of the convergence status by the evaluation unit.

* * * * *